UNITED STATES PATENT OFFICE.

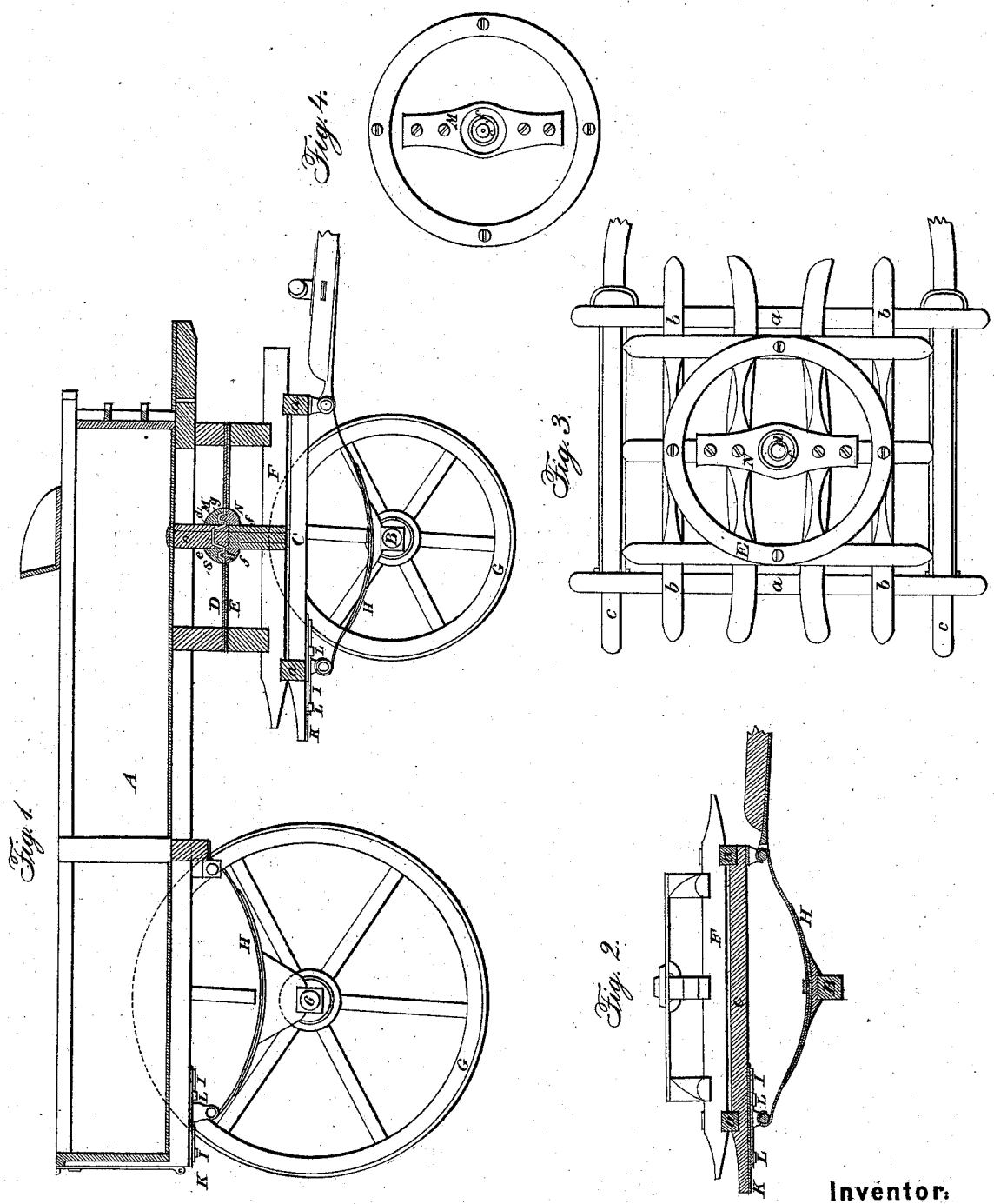

JAMES DOWD, OF BOSTON, MASSACHUSETTS.

IMPROVEMENT IN WAGONS.

Specification forming part of Letters Patent No. 48,381, dated June 27, 1865.

*To all whom it may concern:*

Be it known that I, JAMES DOWD, of Boston, in the county of Suffolk and State of Massachusetts, have invented a new and useful Improvement in Wagons; and I do hereby declare the same to be fully described in the following specification and represented in the accompanying drawings, of which—

Figure 1 is a longitudinal section of a wagon provided with my invention. Fig. 2 is a longitudinal section of one of its springs and its connection with the swiveling truck-frame over it. Fig. 3 is a top view of the said swiveling frame and its rocker-plate. Fig. 4 is an under-side view of the upper rocker-plate.

In the said drawings, A denotes the wagon-body; B and C, the front and rear axles; D, the upper sweep-ring; E, the lower or truck sweep-ring; F, the truck, and G G the wheels.

Near each of the wheels a semi-elliptic spring, H, is fastened at its middle to the axle of such wheel. One end of the said spring is jointed to the wagon-body or to the truck in the ordinary manner. The other end of the spring, however, is not jointed directly to the said body or truck, but to a slider, I, which lies against a base-plate, K, and is secured thereto by two hasps or staples, L L, through which the slider can slide longitudinally. For the purpose of so supporting the springs applied to the truck F, I extend the lower cross-bars, *a a*, of such truck in opposite directions beyond the middle or longitudinal bars, *b b*, &c., and lock to them two tie-bars, *c c*. The spring H, I joint to the tie-bar *c*, and I also connect the slider I, by its seat-plate K, to the said bar *c*. The bar *c* thus serves as a support for the front springs and the slider thereof.

O represents the transom-bolt, and M N the rocker-plates of the body and the truck.

Instead of making the rocker-plates in the ordinary manner, I form one of them with a journal or pivot, *d*, to encompass the transom-bolt and enter a corresponding socket or step, *e*, formed in the other plate and concentrically with the hole thereof, for the reception of the transom-bolt. I also form around the pivot *d* and in the lower rocker-plate an annular channel, *f*, for holding oil and receiving the projecting part *g* of the upper plate. The pivot *d*, with the step *e*, takes the strain of the draft, as well as lateral strains, which would otherwise be borne by the transom-bolt. Thus by means of the said pivot and step the transom-bolt is relieved of all lateral strains tending to wear or break it, the bolt under such circumstances performing the office simply of connecting the wagon-body to the truck.

By means of the slider L applied to each spring the said spring will be free to bend and play without becoming "set" or overstrained, as it is likely to be under the pressure of a heavy load on the wagon when both ends are jointed directly to the wagon body or truck in the ordinary manner.

I claim as my invention the following, viz:

1. The combination of the oil-holding channel *f* with the tubular pivot *d* and step *e*, applied to the rocker-plates and the transom-bolt as specified.

2. The combination of the slider L with the spring and the wagon body or truck, in manner and so as to operate substantially as described.

3. The combination and arrangement of the auxiliary or tie bars *c c* with the truck F and the springs H H and their sliders I I, applied thereto, substantially as explained.

JAMES DOWD.

Witnesses:
R. H. EDDY,
F. P. HALE, Jr.